United States Patent
Xu et al.

(10) Patent No.: US 7,529,484 B2
(45) Date of Patent: May 5, 2009

(54) TRIPLEXER TRANSCEIVER USING PARALLEL SIGNAL DETECTION

(75) Inventors: Lei Xu, Princeton, NJ (US); Lei Zong, Princeton, NJ (US); Philip Nan Ji, Princeton, NJ (US); Ting Wang, Princeton, NJ (US); Yuji Abe, Tokyo (JP)

(73) Assignee: NEC Laboratories America, Inc., Princeton, NJ (US)

( * ) Notice: Subject to any disclaimer, the term of this patent is extended or adjusted under 35 U.S.C. 154(b) by 518 days.

(21) Appl. No.: 11/276,486

(22) Filed: Mar. 2, 2006

(65) Prior Publication Data

US 2007/0133987 A1 Jun. 14, 2007

Related U.S. Application Data

(60) Provisional application No. 60/743,034, filed on Dec. 14, 2005.

(51) Int. Cl.
*H04J 14/00* (2006.01)
*H04J 14/02* (2006.01)

(52) U.S. Cl. ............... 398/67; 398/83; 398/85; 398/135; 398/139

(58) Field of Classification Search ........ 398/85, 398/83, 71, 72, 67, 66, 63, 58, 61, 69, 70, 398/84, 135, 138, 139, 59
See application file for complete search history.

(56) References Cited

U.S. PATENT DOCUMENTS 5,136,411 A * 8/1992 Paik et al. .............. 398/72

6,895,185 B1 * 5/2005 Chung et al. .............. 398/72
7,398,021 B2 * 7/2008 Shin et al. .................. 398/72
2005/0025485 A1 * 2/2005 Lee et al. ................... 398/71

* cited by examiner

*Primary Examiner*—M. R. Sedighian
(74) *Attorney, Agent, or Firm*—Brosemer, Kolefas & Associates

(57) ABSTRACT

An optical triplexer transceiver that utilizes parallel signal detection for use in broadband passive optical networks (B-PONs). The triplexer transceiver includes an optical filter comprising a first port coupled to a laser for receiving upstream optical data signals, a second port for passing the upstream optical data signals to a network, and for receiving combined downstream optical data and video signals from the network, the video signals modulated by subcarrier modulation (SCM), and a third port for communicating the combined downstream optical data and video signals to a photodetector constructed and arranged for simultaneously receiving the combined downstream optical data and video signals and converting the optical data and video signals to electrical signals. A plurality of filters are coupled to the photodetector for separating the combined downstream data and video signals, including a low-pass filter for passing the downstream data signals, and a band-pass filter for passing the video signals. The video signals are coherently detected in a number of stages corresponding to stages of SCM applied to the video signals. The triplexer transceiver is adapted to receive optical video signals that have been subjected first and second stages of SCM to move the spectra of the SCM video signals to a higher frequency range that does not overlap with a frequency range of the baseband data signals.

5 Claims, 16 Drawing Sheets

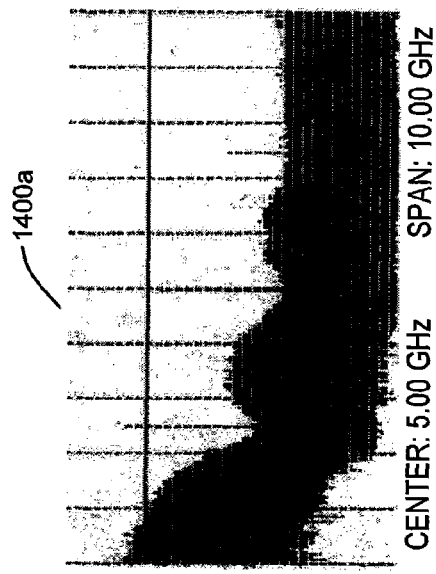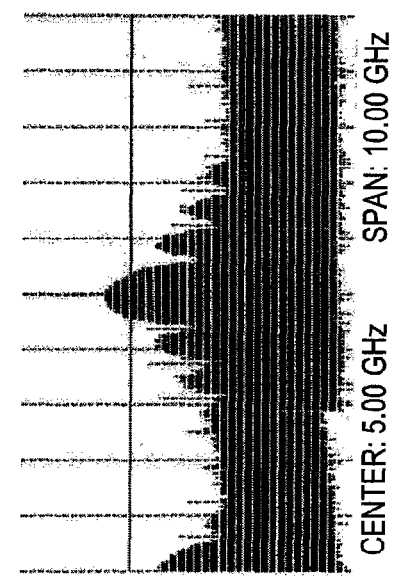

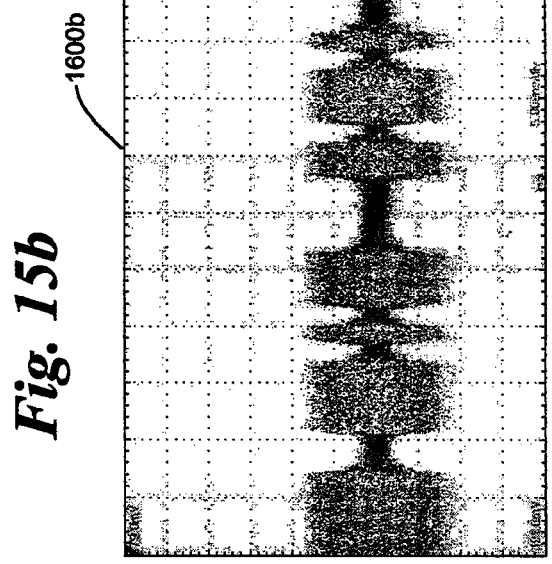
*Fig. 15b*
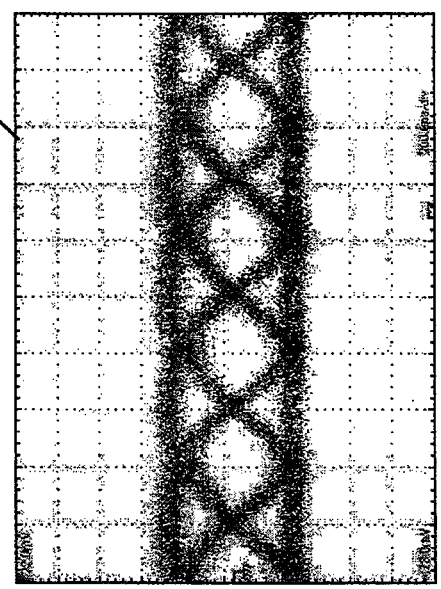
*Fig. 16b*
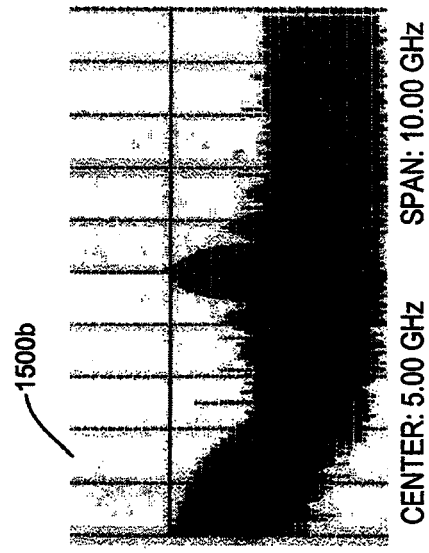
*Fig. 15a*
*Fig. 16a*

TRIPLEXER TRANSCEIVER USING PARALLEL SIGNAL DETECTION

This non-provisional application claims the benefit of U.S. Provisional Appl. Ser. No. 60/743,034, entitled "TRIPLEXER TRANSCEIVER USING PARALLEL SIGNAL DETECTION," filed on Dec. 14, 2005.

BACKGROUND OF THE INVENTION

The present invention relates generally to optical networking, and more particularly, to a triplexer transceiver that incorporates parallel signal detection for use in passive optical networks (PONs).

The development of optical fiber communication technologies has enabled exponential growth in the capacity of backbone networks. Commercially deployed optical communication systems can now carry ~3 Tbps in a single fiber, and experimental applications have demonstrated that ultra-dense wavelength division multiplexing (WDM) channels can be transmitted at rates in excess of 10 Tbps. However, current generation access networks, such as digital subscriber line (DSL) and cable hybrid fiber/coaxial (HFC) systems, are constrained by applications such as video-on-demand, video conferencing, large-file transfers, data mirroring, and the like, all of which demand very high bandwidth. The DSL architecture can only support a downstream bandwidth of several Mb/s and an upstream bandwidth of a couple hundred Kbps. Moreover, the transmission distance between any DSL subscriber and a central office is typically limited to 3.4 miles or less. With respect to HFC, traditional cable television systems are not optimized for access network applications. In view of these limitations, optical access networks are ideally suited to building future access networks. The maturity of integration and new packaging technologies, such as un-cooled semiconductor lasers and small form-factor pluggable (SFP) packaging, have enabled optical fiber access networks start to compete with current access network technologies by providing much higher bit rates and better service with reasonable economics.

Fiber optic distribution networks are becoming increasingly important for the provision of high bandwidth data links to commercial and residential locations. Such systems employ optical data transmitters and receivers ("transceivers") throughout the fiber optic distribution network. These transceivers convert electrical signals to optical signals for optical transmission over optical fibers and receive optical signals from the fibers and convert the modulated light to electrical signals. In active optical networks, the transceivers provide optical-o-electrical-to-optical (OEO) conversion at each node in the network. These elements incorporate high speed electrical circuits in combination with active and passive optical components. Unfortunately, the need to deploy large numbers of transceivers in active optical networks can add considerable costs to the fiber optic network.

The PON architecture eliminates the requirement for OEO conversion, and hence transceivers, at each node of the fiber optic network. In this regard, PONs utilize passive optical components such as beam splitters and filters at network nodes instead of active optical components. A PON therefore has significant cost benefits when compared to active fiber optic networks. PONs have also been designed for two-way, point-to-multipoint data communication, and consequently have significant potential for "last mile" applications where both two-way data transfer and point-to-multipoint broadcast to end users are desired. Accordingly, PONs have many advantages over current access technologies and are expected to be deployed as next-generation access networks. Based on a passive point-to-multipoint network architecture, PONs can support very high transmission bit rates (hundreds of Mb/s or several Gb/s), and numerous broadband services (i.e., Ethernet access, video distribution, voice, etc).

The architecture of a typical PON 100 with a point-to-multipoint architecture is depicted in FIG. 1. An illustrative PON network comprises an optical line terminal (OLT) 102 coupled to a core network(s) 104, a passive optical splitter 106 in communication with the OLT 102, and a plurality of optical network terminals (ONTs)/optical network units (ONUs) $108_1, 108_m, \ldots 108_n$. The OLT 102 is disposed at the central office and connects the users' local networks $110_1, 110_m, \ldots 110_n$ to the core networks 104. An optical splitter divides the single line into a plurality of equal channels. The ONT provides an interface between the optical network and a user network. This architecture can provide a connection between the OLT and ONT with one fiber using coarse wavelength division multiplexing (CWDM) for bidirectional traffic streams. The downstream traffic from the OLT is broadcasted to all ONTs through the optical splitter, and then each ONT selects traffic addressed to that OLT. For upstream transmission, each ONT can send upstream traffic after getting permission from the OLT. Depending on where the PON terminates, the network can be categorized as fiber-to-the-curb (FTTC), fiber-to-the-building (FTTB), fiber-to-the-premise (FTTP) or fiber-to-the-home (FTTH). By leveraging current commercial optical communication technologies, PON systems can support transmission bit rate of hundreds of Mb/s or several Gb/s, a tenfold increase over existing broadband technologies such as DSL and broadband HFC.

In broadband passive optical networks (B-PONs), the asynchronous transfer mode (ATM) format has been adopted and information can be delivered in accordance with various quality-of-service (QoS) requirements. B-PON upstream transmission rates are 155 Mb/s and 622 Mb/s, and downstream transmission rates are 155 Mb/s, 622 Mb/s and 1.244 Gb/s. In B-PONs, three spectral bands, each having central wavelengths at 1310 nm 1490 nm and 1550 nm, are employed for transmitting upstream data, downstream data and downstream video, respectively. The architecture of a typical B-PON network 200 is depicted in FIG. 2. The B-PON network 200 includes a core network 202 comprising a data network 204 and video network 206. A central office 208 comprises a data OLT 210 and video OLT 212 from which downstream data is communicated at a central wavelength of 1490 nm and to which upstream data is received at a central wavelength of 1310 nm. The video OLT 212 communicates downstream video at 1550 nm. The downstream data and video are combined at 214 and communicated over optical fiber distribution 216 to an optical power splitter 218. The optical power splitter 218 communicates with a plurality of ONTs/ONUs $220_1, 220_m, \ldots 220_n$ to connect the users' local networks $222_1, 222_m, \ldots 222_n$.

A triplexer transceiver is a key component of a B-PON, and is deployed on the user side or in an optical network terminal (ONT) for transmitting and receiving data and video signals in the three aforementioned wavelength bands. In traditional triplexer transceivers optical downstream data and video signals are separated by optical spectral filters and detected separately. FIG. 3 is a schematic of an illustrative prior art triplexer transceiver 300. In this expedient, the upstream data signal drives a semiconductor laser 302 which operates at a central wavelength of 1310 nm. The downstream video (1550 nm) and data (1490 nm) signals are separated by three-port optical spectral filters 304, 306 and detected separately at photodetectors 308, 310, respectively. The three-port optical filters can be comprised of thin-film type filters. The transmission ports of these filters are configured with a passband to drop the desired channels. Thus, signals outside of this passband are reflected. The optical insertion loss of three-port thin film filters is generally less than 1 dB. For the triplexer structure in FIG. 3, the downstream video signal is dropped by the first three-port filter and experiences minimal loss. The downstream data (1490 nm) and upstream data (1310 nm) signals are separated by the second three-port filter.

In B-PONs, the data and video signals usually have different modulation formats. For the optical upstream and downstream data signals, an electrical data signal modulates the light intensity and an optical baseband signal is generated for transmission. This optical baseband signal can be detected directly. The downstream video signals usually carry tens or hundreds of channels, each channels having a bandwidth of 6 MHz. Subcarrier modulation (SCM) has been adopted for transmission of video signals. With SCM, different video channels are used to modulate radio frequency (RF) carriers at different frequencies. These are then combined and modulate the same optical carrier. For SCM signal detection, a tunable filter selects the different channels, and signal demodulation is accomplished through coherent detection.

In view of the above, it would be advantageous to deploy improved triplexer transceivers in B-PON systems which reduce costs and improve access network performance to provide better quality of service.

SUMMARY OF THE INVENTION

In accordance with an aspect of the present invention, an optical triplexer transceiver is provided for use in broadband passive optical networks that utilizes parallel signal detection. The triplexer transceiver includes an optical filter comprising a first port coupled to a laser for receiving upstream optical data signals, a second port for passing the upstream optical data signals to a network, and for receiving combined downstream optical data and video signals from the network, the video signals modulated by subcarrier modulation (SCM), and a third port for communicating the combined downstream optical data and video signals to a photodetector constructed and arranged for simultaneously receiving the combined downstream optical data and video signals and converting the optical data and video signals to electrical signals. A plurality of filters are coupled to the photodetector for separating the combined downstream data and video signals, including a low-pass filter for passing the downstream data signals, and a band-pass filter for passing the video signals. The video signals are coherently detected in a number of stages corresponding to stages of subcarrier modulation (SCM) applied to the video signals. The triplexer transceiver is adapted to receive optical video signals that have been subjected first and second stages of SCM to move the spectra of the SCM video signals to a higher frequency range that does not overlap with a frequency range of the baseband data signals.

In accordance with another aspect of the invention in a broadband passive optical network for transmitting downstream optical data and voice signals, and upstream optical data signals, to and from an optical network terminal, respectively, a method is provided comprising the steps of: receiving optical baseband data signals; receiving optical video signals that have been subjected to a first stage of subcarrier modulation (SCM); employing a second stage of SCM to move the spectra of the SCM video signals to a higher frequency range that does not overlap with a frequency range of the baseband data signals; and combining the optical baseband data signals with the second-stage SCM shifted video signals and transmitting the combined optical data and SCM video signals to the optical network terminal.

In accordance with a further aspect of the invention, the method above further comprises the steps of: generating upstream optical data signals from upstream electrical signals received from a user; communicating the upstream optical data signals to a first port of an optical filter; through a second port of the optical filter, passing the upstream optical data signals to the network, and receiving the combined downstream optical data and SCM video signals from the network; receiving the combined downstream optical data and SCM video signals from a third port of the optical filter and photodetecting the combined downstream optical data and SCM video signals and converting the downstream optical data and SCM video signals to electrical signals; and filtering the photodetected downstream optical data and SCM video signals to separate the downstream data and SCM video signals, where the SCM video signals may be coherently detected in several stages corresponding to the stages of SCM.

The above implementations confer significant advantages for optical communication networks by dramatically reducing device cost, while simultaneously improving network performance.

These and other advantages of the invention will be apparent to those of ordinary skill in the art by reference to the following detailed description and the accompanying drawings.

BRIEF DESCRIPTION OF THE DRAWINGS

FIG. 14a is a diagram of the RF spectrum of the OC-48 baseband signal in the experimental setup depicted in FIG. 12;

FIG. 14b is a diagram of the RF spectrum of the OC-12 SCM signal in the experimental setup depicted in FIG. 12;

FIG. 15a is a diagram of the optical spectrum of the combined baseband and SCM signal in the experimental setup depicted in FIG. 12;

FIG. 15b is a diagram of the RF spectrum of the combined baseband and SCM signal in the experimental setup depicted in FIG. 12;

FIG. 16a is an eye diagram of the received baseband signal in the experimental setup depicted in FIG. 12;

FIG. 16b is a diagram depicting the data pattern of the received SCM signal in the experimental setup depicted in FIG. 12;

DETAILED DESCRIPTION OF THE PREFERRED EMBODIMENT

The present invention is described hereinbelow with specific reference to the accompanying drawings in which like numerals represent like elements throughout the figures, and in which exemplary embodiments of the invention are depicted.

Figure 1:
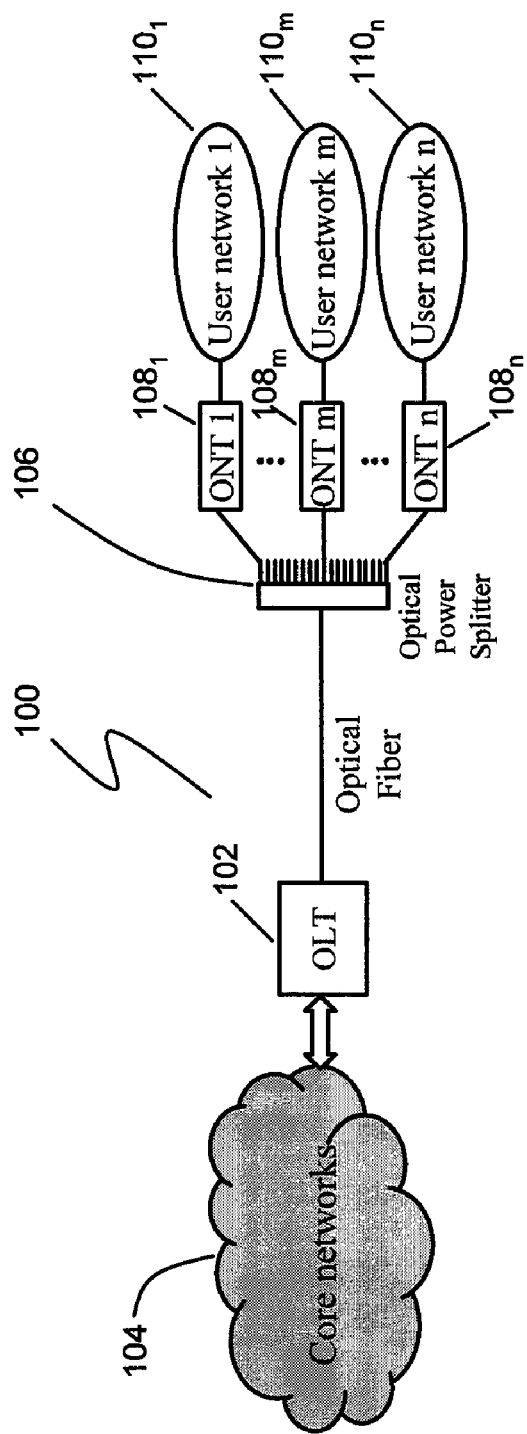
FIG. 1 is a schematic diagram of a prior art passive optical network (PON) architecture.
Figure 2:
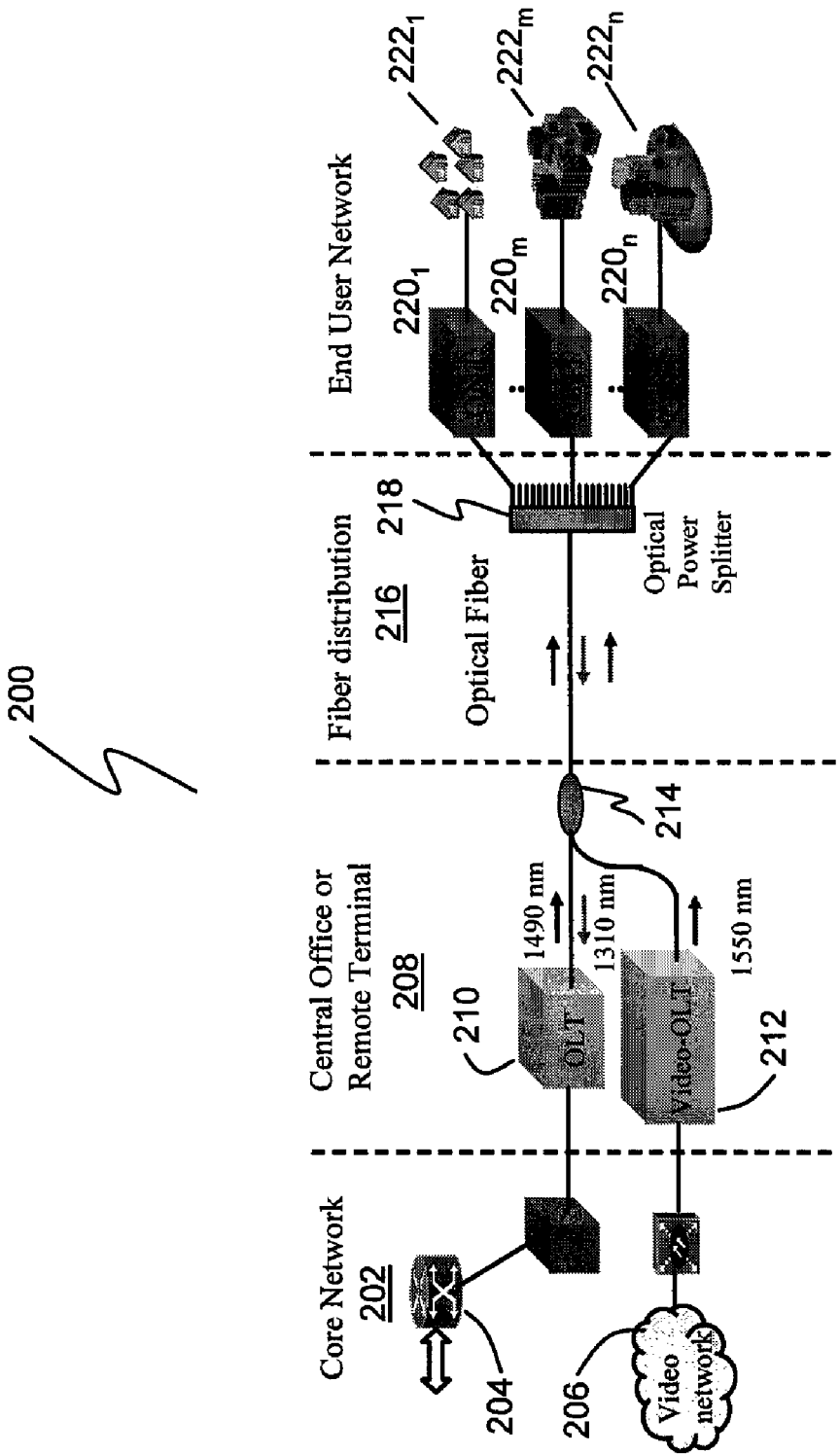
FIG. 2 is a schematic diagram of a prior art broadband passive optical network architecture (B-PON)
Figure 3:
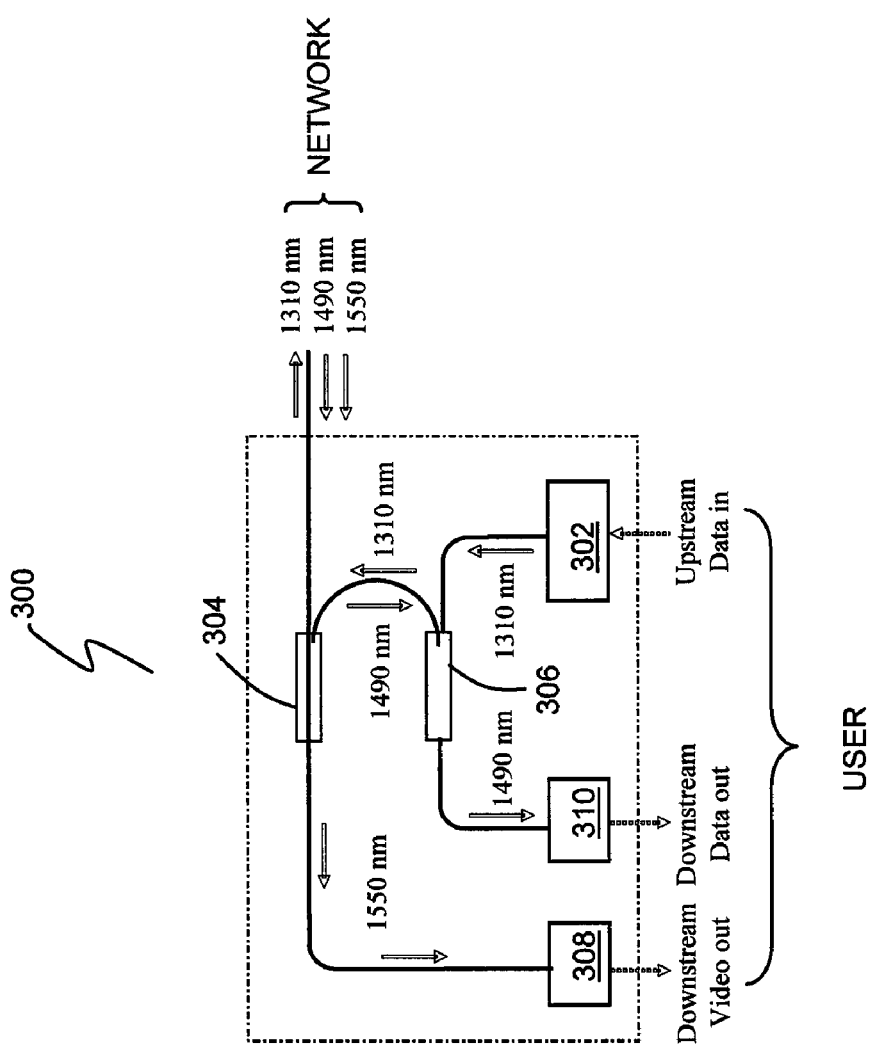
FIG. 3 is a schematic diagram of the structure of a prior art triplexer transceiver utilized in a B-PON.
Figure 4:
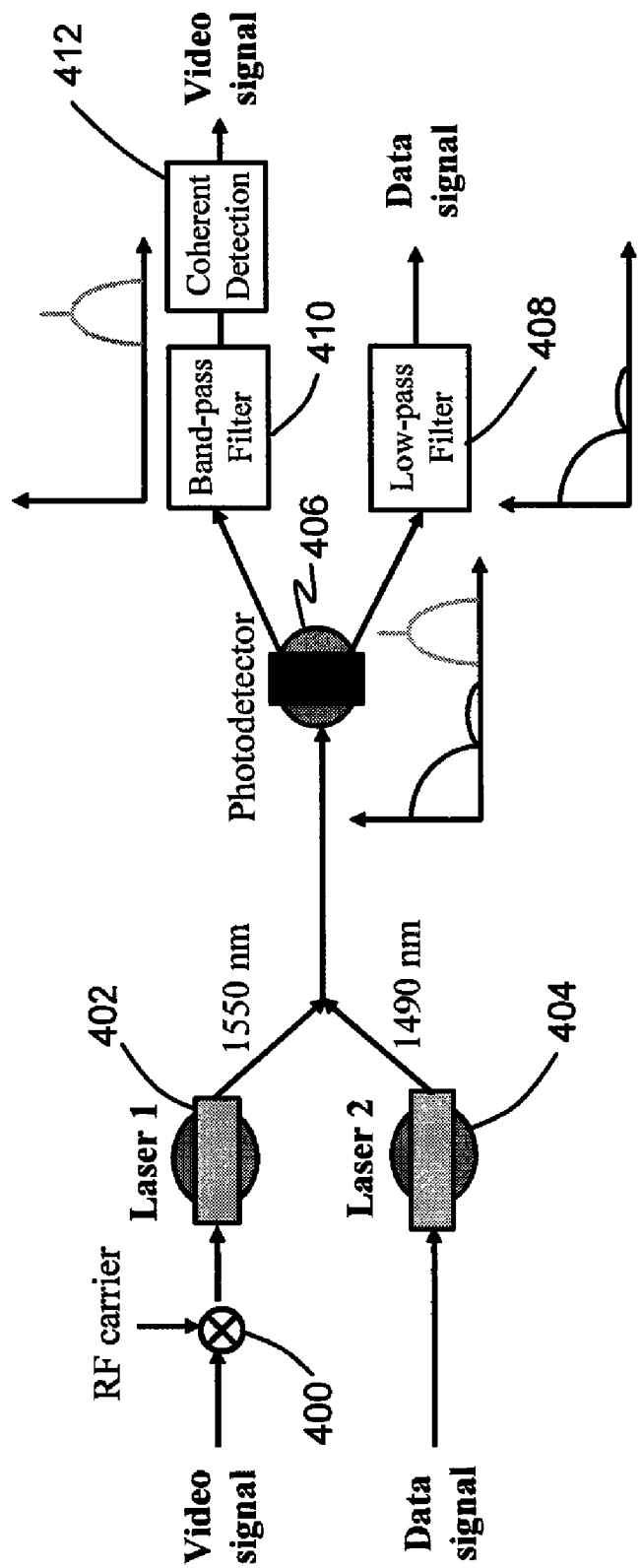
FIG. 4 is a schematic flow diagram of the principal of parallel signal detection (PSD) of baseband data and SCM video signals in accordance with an aspect of the present invention.

FIG. 4 is a block diagram that illustrates parallel signal detection (PSD) of a downstream baseband data and SCM video signal. The data signal occupies the baseband of the RF spectrum. The spectrum of video signals can be moved to higher frequency band via SCM. Traditionally, video signals of multiple channels are multiplexed through SCM using relatively low carrier frequency, and their RF spectrum may overlap with the baseband signal. In this case, the RF spectrum can be shifted to higher frequency band with a second stage of SCM modulation at 400. The SCM video signal is applied to a laser 402 and the data signal is applied to a laser 404. Under the guarantee of the spectral separation, the baseband data signal and SCM video signal can be detected jointly with a single photodetector 406. The photodetected baseband data signal and SCM video signal is then applied to an electrical low-pass filter 408 and bandpass filter 410, which are employed to separate the baseband data and SCM video signals, respectively. The filtered video signal is then coherently detected at block 412.

In a simplified description (without considering the random nature of the signals or the influence of noise), the combined optical baseband and SCM signals can be expressed as:

$$E_{total} = \sqrt{A_1 + f_1 \cos(\omega_1 t + \phi_1)} e^{j(\Omega_1 t + \phi_{opt1})} + \sqrt{A_2 + f_2} e^{j(\Omega_2 t + \phi_{opt2})} \quad (1)$$

where $f_1$ and $f_2$ are the input signals, $A_1$ and $A_2$ are the signal bias for electro-optical modulation, $\omega_1$ is the subcarrier frequency, $\phi_1$ is the phase for subcarrier modulated signal, $\Omega_1$ and $\Omega_2$ are the optical carrier frequencies, $\phi_{opt1}$ and $\phi_{opt2}$ are the phases for modulated optical signals. When the combined optical signals are received, the photodetector follows the square-law detection as described in N. K. Shankaranarayanan, S. D. Eloy, K. Y. Lau, "WDMA/subcarrier FDMA Lightwave Networks: Limitations Due to Optical Beat Interference," Journal of Lightwave Technology, v. 9, n. 7, 1991, p 931. The photocurrent of the received signal can be expressed as:

$$i = \frac{R}{2} \mathrm{Re}[E_{total} E_{total}^*] \quad (2)$$
$$= \frac{R}{2}(A_1 + f_1 \cos(\omega_1 t + \phi_1)) + \frac{R}{2}(A_2 + f_2) +$$
$$R\sqrt{(A_1 + f_1 \cos(\omega_1 t + \phi_1)) \cdot (A_2 + f_2)} \cos((\Omega_1 - \Omega_2)t + (\phi_{opt1} - \phi_{opt2}))$$

where R is the responsibility of the detector. The first and second terms in equation (2) represent the input SCM and baseband signals, respectively. The third term represents the beating between the input baseband signal and the SCM signal which are at different optical frequencies. When the two optical frequencies are very close to each other ($\Omega_1 \approx \Omega_2$), the random phase relationships of the two optical carriers ($\phi_{opt1}$ and $\phi_{opt2}$) can cause serious beating noise to the received signal. When the frequency difference between the two optical carriers ($|\Omega_1 - \Omega_2|$) are much larger than the detector bandwidth, the third term can be neglected. In B-PON applications, the wavelength difference between the optical downstream data and video signals is about 60 nm or ~7.5 THz, which is much larger than the detector bandwidth (up to tens of GHz). Therefore, the beating noise term can be neglected in our analysis of B-PON systems.

Applying a Fourier transform, the spectrum of the received signal (the first and second terms in equation (2)) is represented by:

$$S_{rec}(\omega) = \pi(A_1 + A_2)\delta(\omega) + \frac{1}{2}\left(\frac{1}{2}F_1(\omega - \omega_1) + \frac{1}{2}F_1(\omega + \omega_1) + F_2(\omega)\right) \quad (3)$$

where $F_1$ and $F_2$ are the Fourier transform of signal $f_1$ and $f_2$, respectively. As shown in equation (3), the spectrum of signal $f_1$ is shifted to frequency region with center at $\omega_1$ through subcarrier modulation. In order to minimize the crosstalk between signal $f_1$ and $f_2$, the SCM carrier frequency $\omega_1$ has to be large enough to guarantee the their spectral separation. For B-PON systems, this is explained in more detail below.

Figure 5:
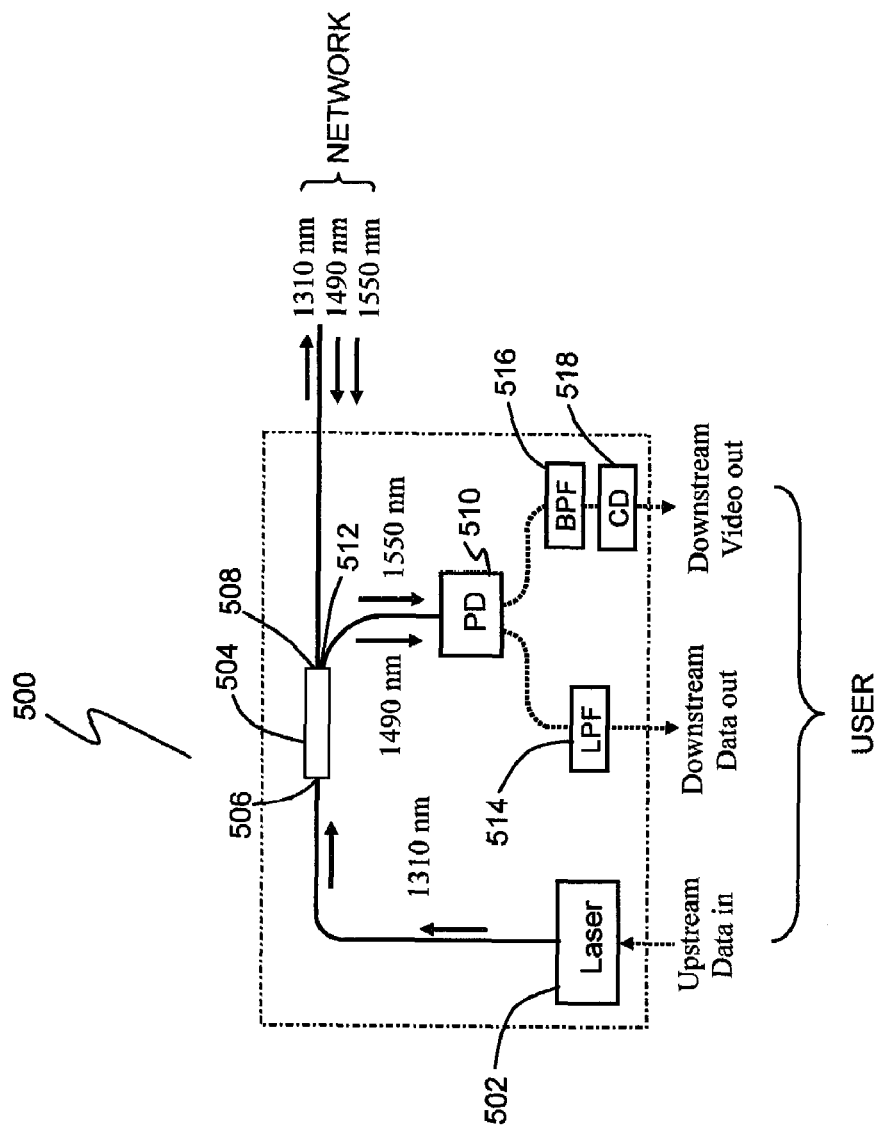
FIG. 5 is a schematic diagram of a the structure of a triplexer transceiver in accordance with an aspect of the present invention.

FIG. 5. is a schematic diagram of a triplexer transceiver 500 in accordance with the present invention which utilizes PSD as explained above. The upstream data signal drives a semiconductor laser 502 that operates at a central wavelength of 1310 nm. The upstream data signal is applied to a three-port optical filter 504 at port 506. The downstream video (communicating at a central wavelength of 1550 nm) and downstream data (communicating at a central wavelength of 1490 nm) are coupled to port 508 of optical filter 504. The downstream video and data are coupled to a single photodetector 510 via port 512 at filter 504. The photodetector 510 simultaneously receives the downstream data and video signals and splits the signals utilizing an electrical splitter which may be part of the photodetector 510, or a separate component (not shown). The downstream data signal is applied to a low-pass filter 514, and the downstream video signal is applied to a band-pass filter 516 and coherent detector 518. By using a single three-port filter 504, insertion losses for the 1310 nm upstream data signal and 1490 nm downstream data signal are minimized.

Figure 6:
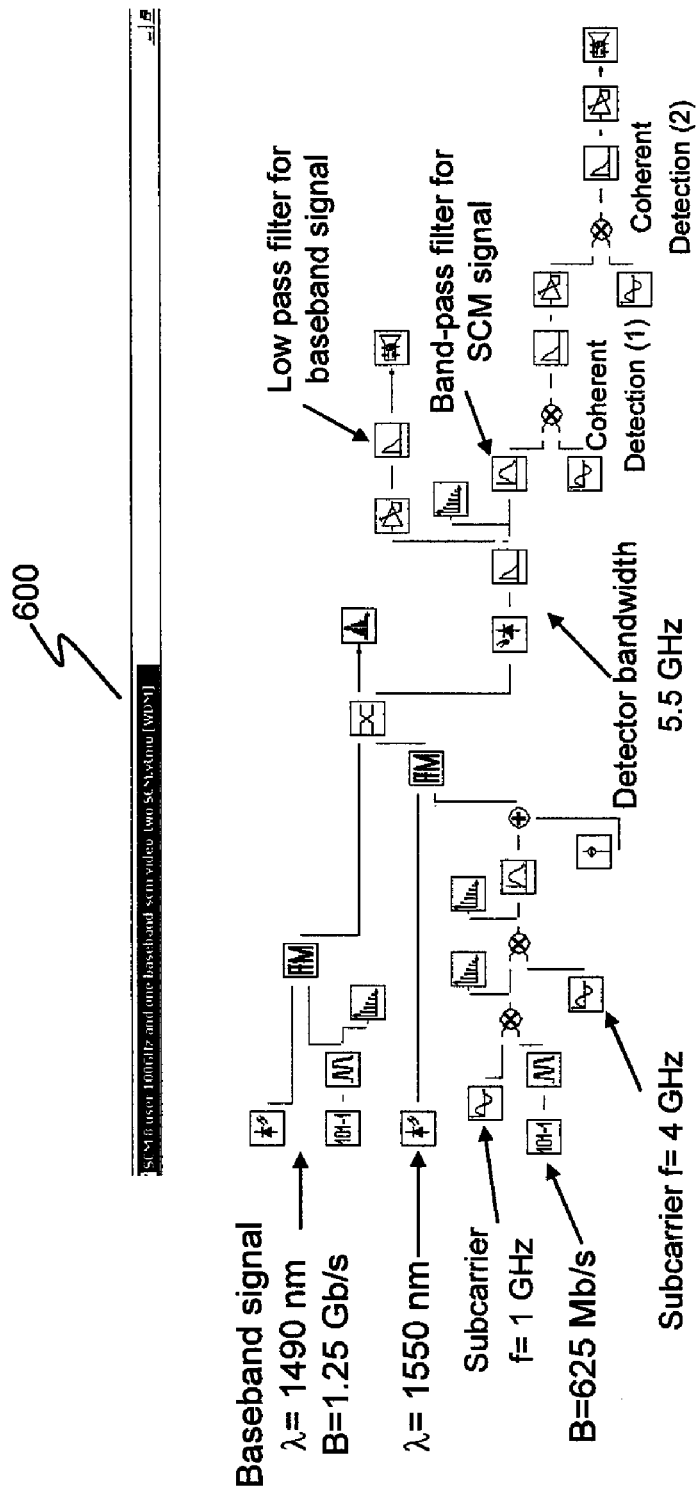
FIG. 6 is a flow diagram of a simulation setup for PSD utilizing VPItransmissionMaker.
Figure 7B:
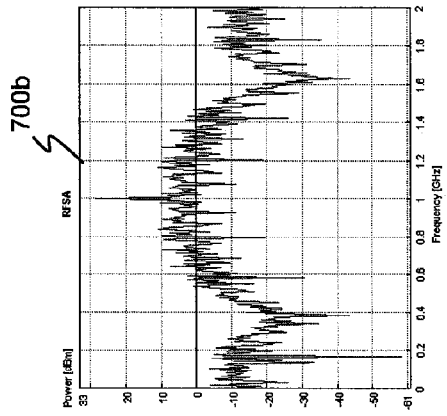
FIG. 7b depicts the RF spectrum of a generated SCM signal for the simulation of video signals in the simulation of FIG. 6.
Figure 7D:
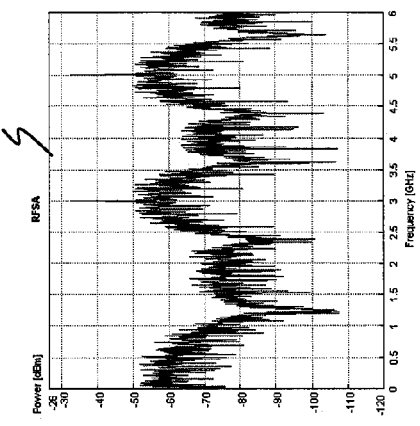
FIG. 7d depicts the RF spectrum of the combined baseband and SCM signal in the simulation of FIG. 6.
Figure 7A:
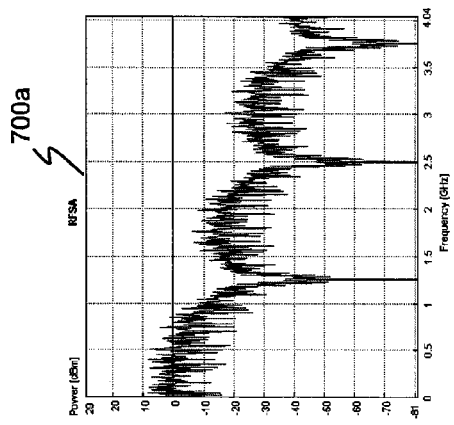
FIG. 7a depicts the radio frequency (RF) spectrum of a baseband signal in the simulation of FIG. 6.
Figure 7C:
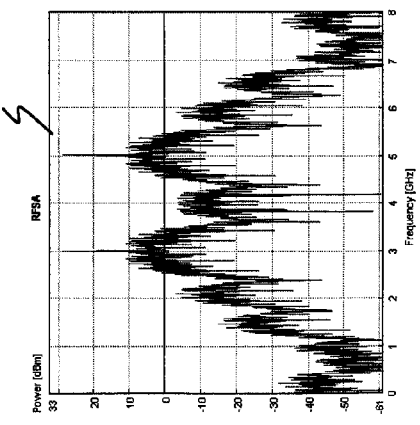
FIG. 7c depicts the RF spectrum of a shifted SCM signal for PSD in the simulation of FIG. 6.
Figure 8B:
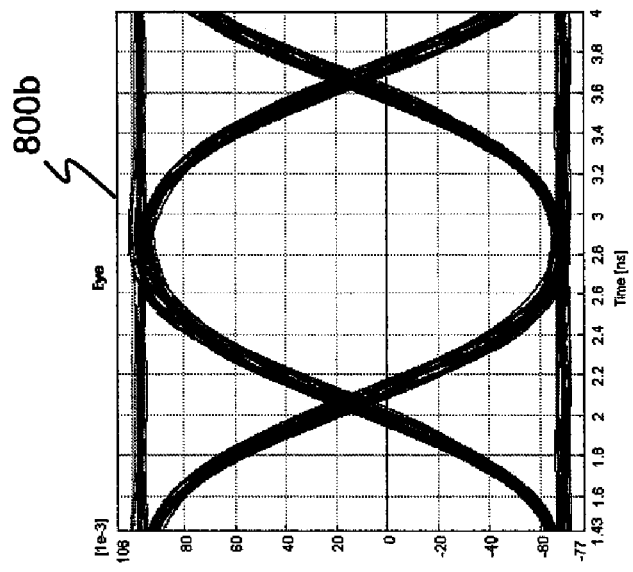
FIG. 8b is an eye diagram of the received SCM signal in the simulation of FIG. 6.
Figure 8A:
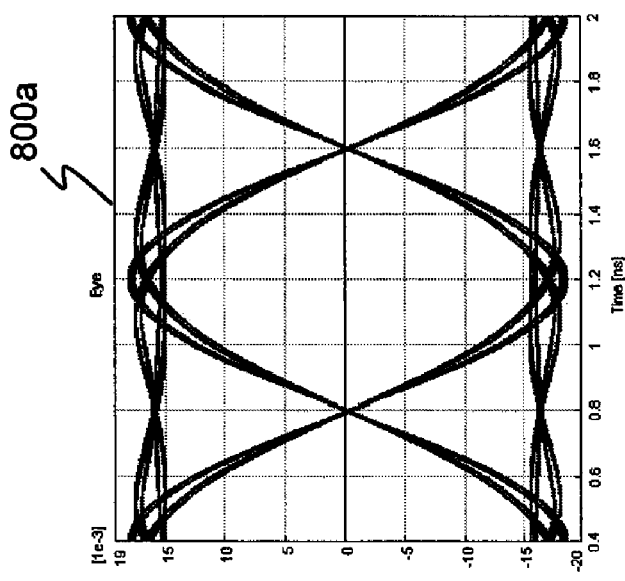
FIG. 8a is an eye diagram of the received baseband signal in the simulation of FIG. 6.

Simulations were conducted in order to demonstrate PSD and evaluate its performance using VPItransmissionMaker, which is a fourth generation photonic design automation tool that can perform extensive simulations to deliver results which are comparable with real life applications. VPItransmission maker is available from VPIphotonics™ design automation, a division of VPIsystems®. FIG. 6 is a flow diagram 600 depicting the VPI simulation setup for PSD. The optical baseband signal is generated by externally modulating the laser output light. In our simulation, the baseband signal is running at 1.25 Gb/s with central wavelength at 1490 nm. In the RF spectrum 700a of the baseband signal shown in FIG. 7a, the main lobe can be seen from 0 to 1.25 GHz. In B-PON systems, the video signals of different channels are modulated onto subcarriers at different frequencies for broadcasting. The video signal is simulated by one channel of high-speed digital SCM signal. The SCM signal is at 625 Mb/s with a subcarrier frequency at f=1 GHz, and the resulting RF spectrum 700b is shown in FIG. 7b. Since the spectrum of the SCM signal (video) overlaps with that of the baseband signal, we use a second stage SCM modulation at subcarrier frequency f=4 GHz to move the SCM signal spectrum 700c to a much higher frequency range, as shown in FIG. 7c. This shifted SCM spectrum enables the combined signals to be detected jointly with a single photodetector. The detector bandwidth is 5.5 GHz, which can cover both the baseband and the SCM signals. The received RF spectrum 700d of the combined signals is shown in FIG. 7d. When the carrier frequency of the SCM modulation (the second stage) is high enough, RF spectral separation of the baseband and SCM signals is achieved. Subsequent to photodetection, low-pass and band-pass filters are utilized to separate the baseband and SCM signals. Two stages of coherent detection are adopted, where each state relates to the corresponding stages of SCM modulations (i.e., at f=1 GHz and f=4 GHz). The eye diagrams 800a, 800b of the received baseband and SCM signals are depicted in FIGS. 8a and 8b, respectively. The clear opening of the "eyes" shows high-quality communication.

Figure 9:
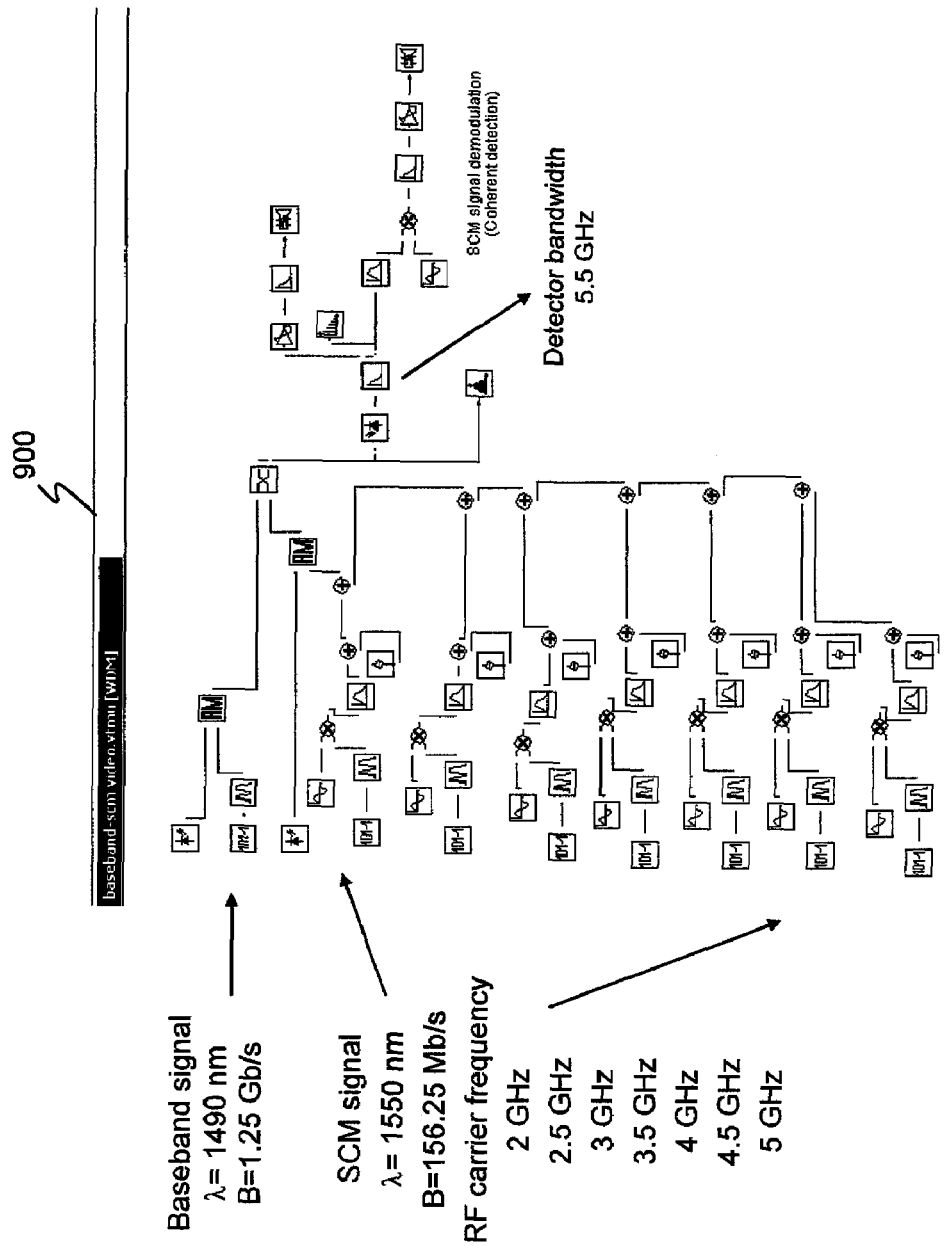
FIG. 9 is a flow diagram of a simulation setup for PSD similar to that in FIG. 6, utilizing PSD with multiple SCM signals corresponding to different channels.

Since most video signals are already broadcasted using SCM modulation, a single stage of SCM modulation can be employed to directly move the signal to a spectral band higher than baseband signal spectrum. FIG. 9 is a flow diagram schematic 900 of a simulation setup for PSD applications having multiple SCM channels. In the exemplary application, there are seven SCM channels running at 156.25 Mb/s. The frequencies of the SCM radio carriers are set at f=2 GHz, 2.5 GHz, 3 GHz, 3.5 GHz, 4 GHz, 4.5 GHz and 5 GHz. The central wavelength of the optical carrier for the SCM signals is 1550 nm. The total capacity of SCM channels is about 1.1 Gb/s, which is enough to support eighty 10 Mb/s video channels. The single photodetector has a bandwidth of 5.5 GHz to cover the baseband signal and all the SCM channels. A low pass filter having 0.7 times the signal bandwidth is utilized to separate the baseband signal. A bandpass filter selects the desired SCM channel and the SCM video signal can be recovered with electrical coherent detection.

Figure 10:
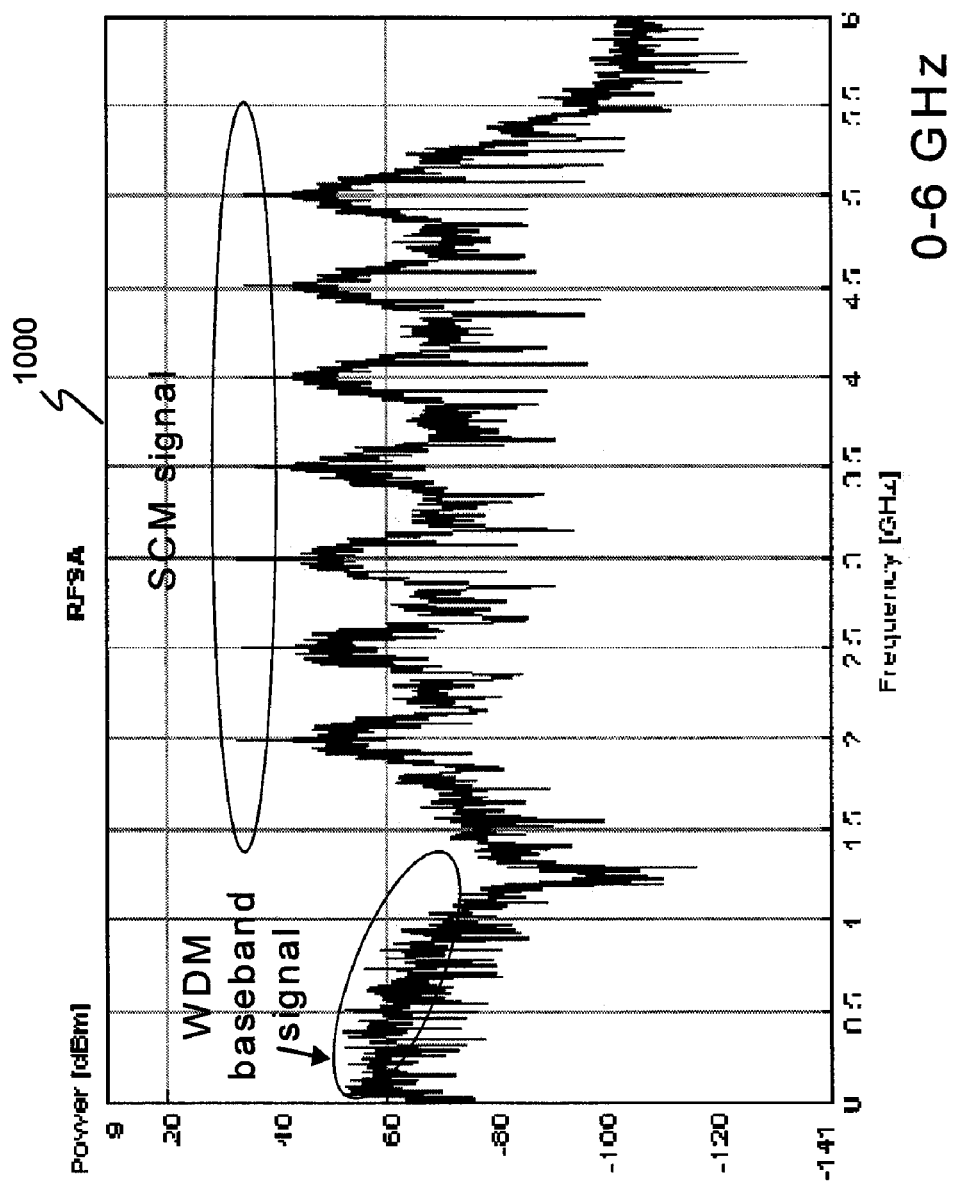
FIG. 10 depicts the RF spectrum of the baseband and SCM signals after PSD in the simulation of FIG. 9.
Figure 11:
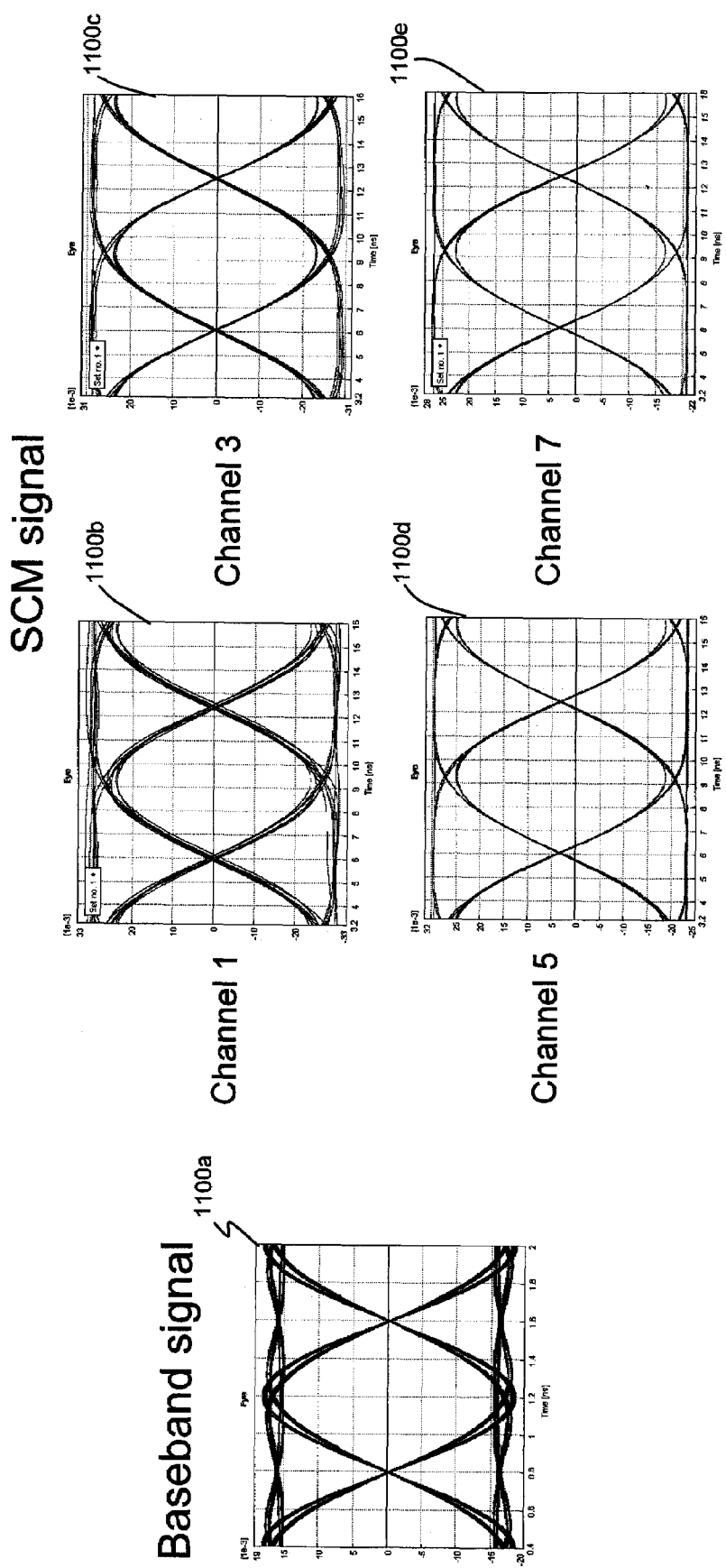
FIG. 11 depicts eye diagrams of the received baseband signal, and the SCM signals (channels 1, 3, 5 and 7) in the simulation of FIG. 9.

The radio frequency spectrum 1000 of the resulting signal after the parallel detection of baseband data and SCM signals is depicted in FIG. 10. The main lobe of the baseband signal spectrum is from 0 Hz to B Hz, where B is the bit rate of the signal. The second lobe is from B Hz to 2B Hz, which has a much smaller intensity. In order to minimize the interference between the baseband and SCM signals, the carrier frequency of the SCM signals should be larger than B Hz. In our simulation, the bit rate of baseband signal is 1.25 Gb/s, and the lowest frequency of SCM channels is at 2 GHz. FIG. 11 depicts an eye diagram 1100a of the received baseband signal, and eye diagrams 1100b, 1100c, 1100d and 1100e of the SCM signals (channels 1, 3, 5, 7), respectively. The clear opening of the "eyes" shows high-quality communication.

Figure 13A:
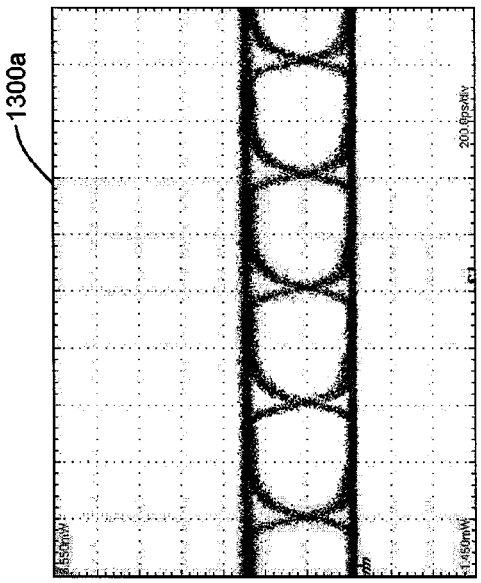
FIG. 13a is an eye diagram of an OC-48 baseband signal (200 ps/div) in the experimental setup depicted in FIG. 12.
Figure 13B:
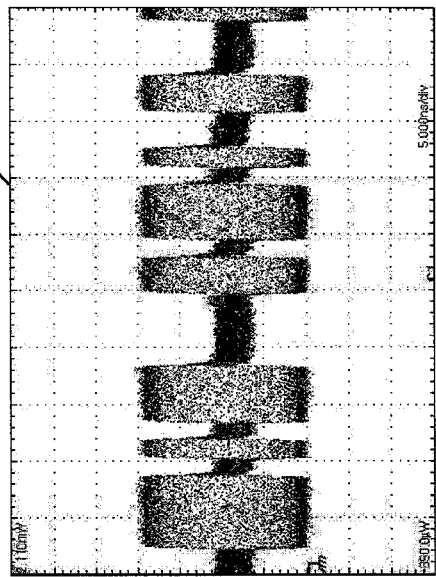
FIG. 13b is a diagram depicting the data pattern of an OC-12 SCM signal (5 ns/div) in the experimental setup shown in FIG. 12.
Figure 12:
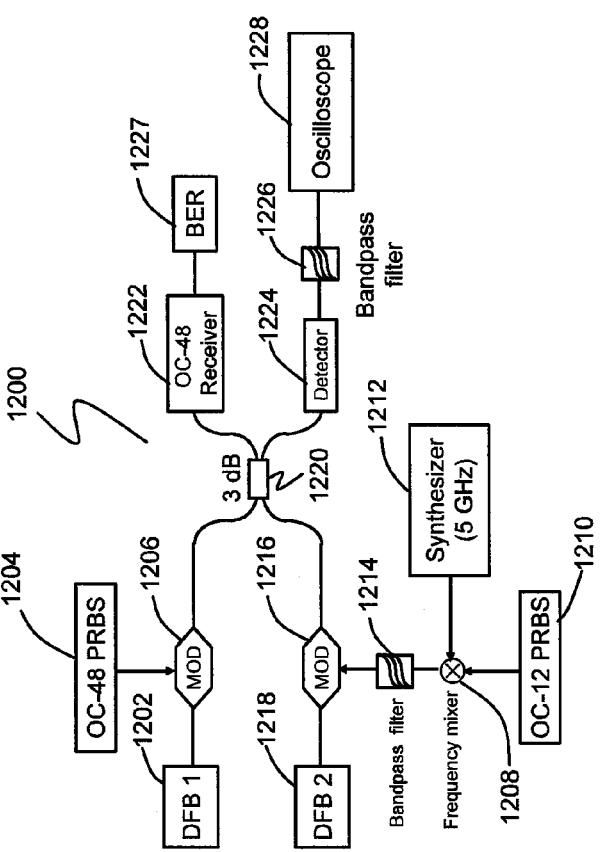
FIG. 12 is a schematic of an experimental setup for PSD of baseband and SCM signals in accordance with an aspect of the present invention.

Referring now to FIG. 12, there is depicted a schematic of an experimental setup 1200 to prove the working principles for PSD. The baseband signal is generated by modulating the output from a distributed feedback (DFB) laser 1202 (operating at 1541.7 nm) with pseudorandom bit sequence at OC-48 1204 at modulation block 1206. An electrical frequency mixer 1208 is used to generate electrical a SCM signal by mixing an OC-12 data signal 1210 with 5 GHz RF carrier, and the output of the mixer is communicated through a band-pass filter 1214 to eliminate the higher-order spectral lobes. The electrical bias of an optoelectronic modulator 1216 is optimized to get a good extinction ratio of the optical SCM signal from DFB laser 1218. The optical SCM signal is at a central wavelength of 1541.5 nm, which is about 25 GHz away from the central wavelength of the baseband signal. The mean optical power for the optical baseband and SCM signals is −4.39 dBm and −4.16 dBm, respectively. FIGS. 13a and 13b depicted the eye diagrams 1300a, 1300b of the OC-48 baseband signal and the data pattern of the OC-12 SCM signal, respectively. The RF spectrum 1400a of the OC-48 baseband signal is shown in FIG. 14a, and the RF spectrum 1400b of the OC-12 SCM signal (span 10 GHz) is depicted in FIG. 14b.

Figure 17:
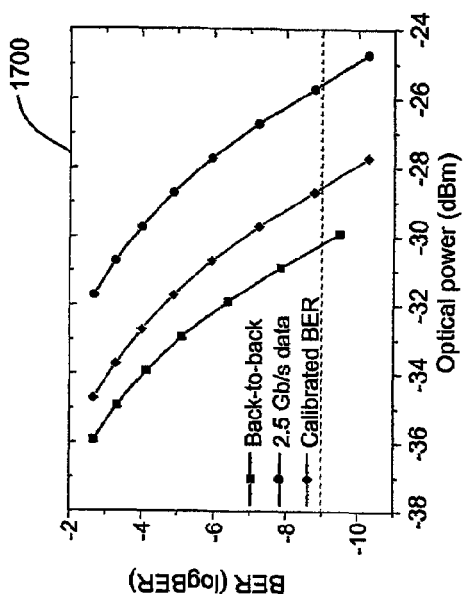
FIG. 17 is a diagram depicting the bit error rate (BER) of the received OC-48 baseband signal in the experimental setup shown in FIG. 12.

Referring again to FIG. 12, the baseband and SCM signals are combined with a 3 dB optical coupler 1220, and their resulting optical spectrum 1500a is shown in FIG. 15a, and RF spectrum 1500b is depicted in FIG. 15b. From FIG. 15b, we can see that the baseband signal and the SCM signal have clear separation in RF spectrum. As depicted in FIG. 12, an OC-48 receiver 1222 is employed to detect the baseband signal, and the received baseband signal 1600a is shown in FIG. 16a. The OC-48 receiver in our experiments has a bandwidth of 1.7 GHz (0.7 times the OC-48 bit rate), and it is used to separate the OC-48 baseband signal from the SCM signal. The baseband signal is applied to a bit error rate (BER) measurement at 1227. The SCM signal is detected at 1224, and applied to a bandpass filter 1226 with a central frequency of 5 GHz and a bandwidth of 1000 MHz. The received SCM signal as communicated to oscilloscope 1228 is shown at 1600b in FIG. 16b. The bit error rate (BER) measurement 1700 of the received OC-48 baseband signal is shown in FIG. 17. Compared with the back-to-back measurement, the received signal has a power penalty of 4.6 dB at BER of $10^{-9}$. The relative large power penalty is due to the SCM signal power which is also included in the measurement. By eliminating the SCM signal power, the calibrated power penalty for baseband signal is about 1.6 dB. The power penalty is mainly due to photodetector saturation caused by optical SCM signal.

Figure 18:
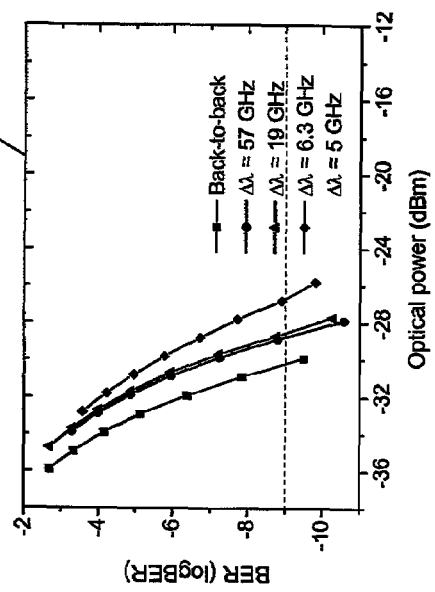
FIG. 18 is a diagram depicting the BER of the received OC-48 baseband signal when the wavelength of the optical baseband signal in the experimental setup shown in FIG. 12 is tuned.

In parallel signal detection, it is important to keep the optical spectral separation to avoid strong beating noises (as shown by Equation 2 above). FIG. 18 is a diagram of the BER measurement (logBER) vs. optical power (dBm) of the received OC-48 baseband signal when the wavelength of the optical baseband signal is tuned. When the wavelength spacing is large (19 GHz and 57 GHz in FIG. 18), the power penalty of the received signal is minimized. When the wavelength spacing is decreased to 6.3 GHz, the power penalty increases by ~2 dB. When the spacing is reduced to 5 GHz, a severe beating noise and an error floor at around $10^{-7}$ appears in the BER measurement.

Figure 19:
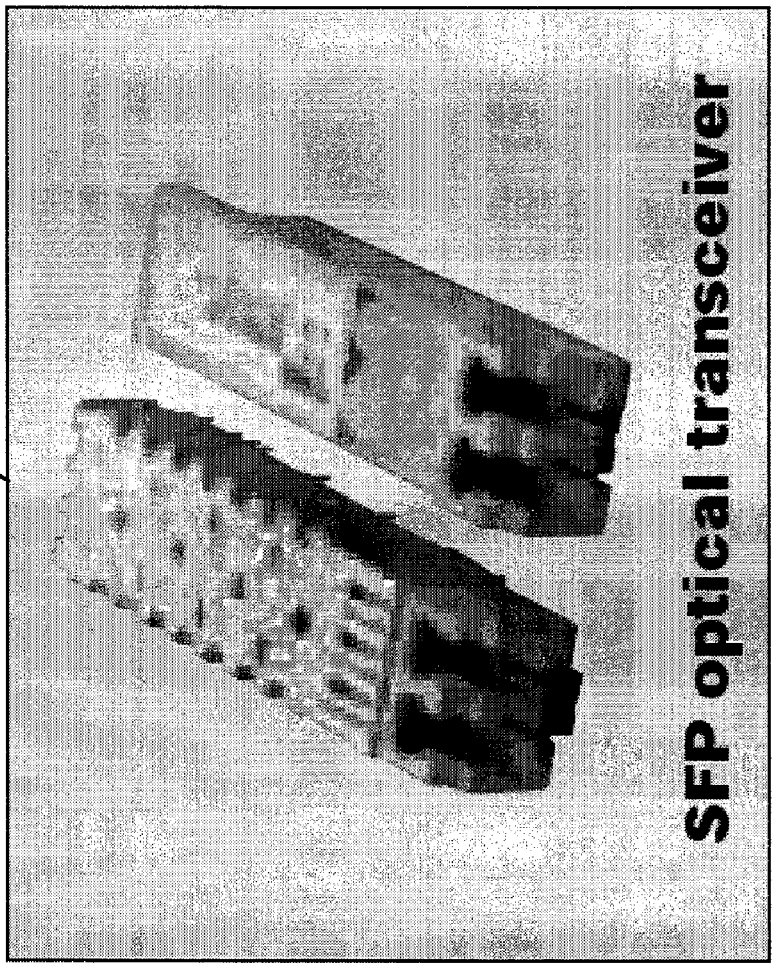
FIG. 19 is a drawing depicting a small form-factor pluggable (SFP) transceiver configuration.

In view of the above, the fundamental principle of PSD can be applied to triplexer transceivers to reduce device cost and improve network performance. It is always desirable in industry to establish uniformity for interchangeable optical modules which will allow the market to grow more rapidly. For the deployment of B-PON systems, the standards for the transceiver package dimensions and electrical interfaces have been suggested as small form-factor pluggable (SFP) as set forth in the Small Form-factor Pluggable (SFP) Transceiver MultiSource Agreement (MSA) Cooperation Agreement for Small Form-Factor Pluggable Transceivers (http://schelto.com/SFP/SFP%20MSA%20091400.htm). SFP provides specifications for a new-generation of optical modular transceivers, and has the following features: physical compactness (~45 mm×13 mm×9 mm), high speed (Gigabit/s and higher), interchangeability, convenience for upgrading and maintenance. A typical SFP optical transceiver 1900 is shown in FIG. 19. SFP transceivers have found applications in PONs, gigabit Ethernet, fiber channel modules for LAN, SONET/SDH, WDM modules, etc. For developing new types of product for B-PON applications, it is important to make them compatible with SFP specifications.

PSD is based on the principle of RF spectral separation of signals from different channels, and it is achieved with SCM modulation. High subcarrier frequency can minimize the crosstalk between channels by having larger spectral separation, but also increases the system complexity and relative cost. There are two factors which should be considered when deciding the subcarrier frequency: (1) Spectral crosstalk between the baseband signal and SCM signal should be within the system requirement (2) Subcarrier frequency should be high enough for the signal to be carried, which is guarded by the Nyquist sampling theorem (For lossless digitization, the sampling rate should be at least twice the maximum frequency responses).

For the transmission of video signals, B-PON dedicates a wavelength for downstream video services using RF over optics technologies. For cable television networks, the FCC allocated three bands of frequencies in the RF spectrum, chopped into 6-MHz slices, to accommodate about 80 TV channels: 54 to 88 MHz for channels 2 to 6, 174 to 216 MHz for channels 7 through 13, 470 to 890 MHz for UHF channels 14 through 83. The subcarrier frequency should be at least 1.8 GHz for lossless transmission of all the TV channels. Considering the spectral range of baseband signals, the actual SCM carrier frequency should be higher.

The present invention has been shown and described in what are considered to be the most practical and preferred embodiments. It is anticipated, however, that departures may be made therefrom and that obvious modifications will be implemented by those skilled in the art. It will be appreciated that those skilled in the art will be able to devise numerous arrangements and variations which, although not explicitly shown or described herein, embody the principles of the invention and are within their spirit and scope.

We claim:

1. An optical triplexer transceiver, comprising:
a laser adapted to be driven by electrical upstream data signals from a user;
an optical filter comprising a plurality of ports, a first port of the optical filter coupled to the laser for receiving upstream optical data signals, a second port of the optical filter for passing the upstream optical data signals to a network, and for receiving combined downstream optical data signals and video signals from the network, and a third port of the optical filter for communicating the combined downstream optical data and video signals to a photodetector constructed and arranged for receiving the combined downstream optical data and video signals and converting the downstream optical data and video signals to electrical signals; and
a plurality of filters coupled to the photodetector for separating the downstream data and video signals, said filters comprising a low pass filter for passing the downstream data signals and a band-pass filter for passing the video signals,
a coherent detector coupled to the band-pass filter for coherently detecting the SCM video signals in two-stages of coherent detection, where each stage corresponds to a stage of SCM
whereby, the separated downstream data and video signals may be communicated to the user;
wherein video signals received by the optical filter comprise a plurality of channels multiplexed by subcarrier modulation (SCM); and
wherein the plurality of video signals are subjected to two stages of SCM.

2. An optical triplexer transceiver, comprising:
a laser adapted to be driven by electrical upstream data signals from a user;
an optical filter comprising a plurality of ports, a first port of the optical filter coupled to the laser for receiving upstream optical data signals, a second port of the optical filter for passing the upstream optical data signals to a network, and for receiving combined downstream optical data signals and video signals from the network, the optical video signals modulated by subcarrier modulation (SCM), and a third port of the optical filter for communicating the combined downstream optical data and video signals to a photodetector constructed and arranged for receiving the combined downstream optical data and video signals and converting the combined downstream optical data and video signals to electrical signals; and
a plurality of filters coupled to the photodetector for separating the combined downstream data and video signals, including a low-pass filter for passing the downstream data signals, and a band-pass filter for passing the video signals; and
a coherent detector for detecting the video signals,
whereby, the separated downstream data and video signals may be communicated to the user.

3. In a broadband passive optical network for transmitting downstream optical data and voice signals, and upstream optical data signals, to and from an optical network terminal, respectively, a method comprising the steps of:
receiving optical baseband data signals;
receiving optical video signals that have been subjected to a first stage of subcarrier modulation (SCM);
employing a second stage of SCM to move the spectra of the SCM video signals to a higher frequency range that does not overlap with a frequency range of the baseband data signals; and combining the optical baseband data signals with the second-stage SCM shifted video signals and transmitting the combined optical data and SCM video signals to the optical network terminal;

generating upstream optical data signals from upstream electrical signals received from a user;

communicating the upstream optical data signals to a first port of an optical filter;

through a second port of the optical filter, passing the upstream optical data signals to the network, and receiving the combined downstream optical data and SCM video signals from the network;

receiving the combined downstream optical data and SCM video signals from a third port of the optical filter and photodetecting the combined downstream optical data and SCM video signals and converting the downstream optical data and SCM video signals to electrical signals; and filtering the photodetected downstream optical data and SCM video signals to separate the downstream data and SCM video signals.

4. The method recited in claim 3, further comprising the step of coherently detecting the SCM video signals.

5. The method recited in claim 3, wherein the step of coherently detecting the SCM video signals comprises two stages of coherent detection, wherein each stage corresponds to a stage of SCM.

* * * * *